Jan. 28, 1958 M. D. BERGAN 2,821,567
FLEXIBLE LIQUID-TIGHT CONDUIT CONNECTORS
Original Filed Aug. 3, 1953
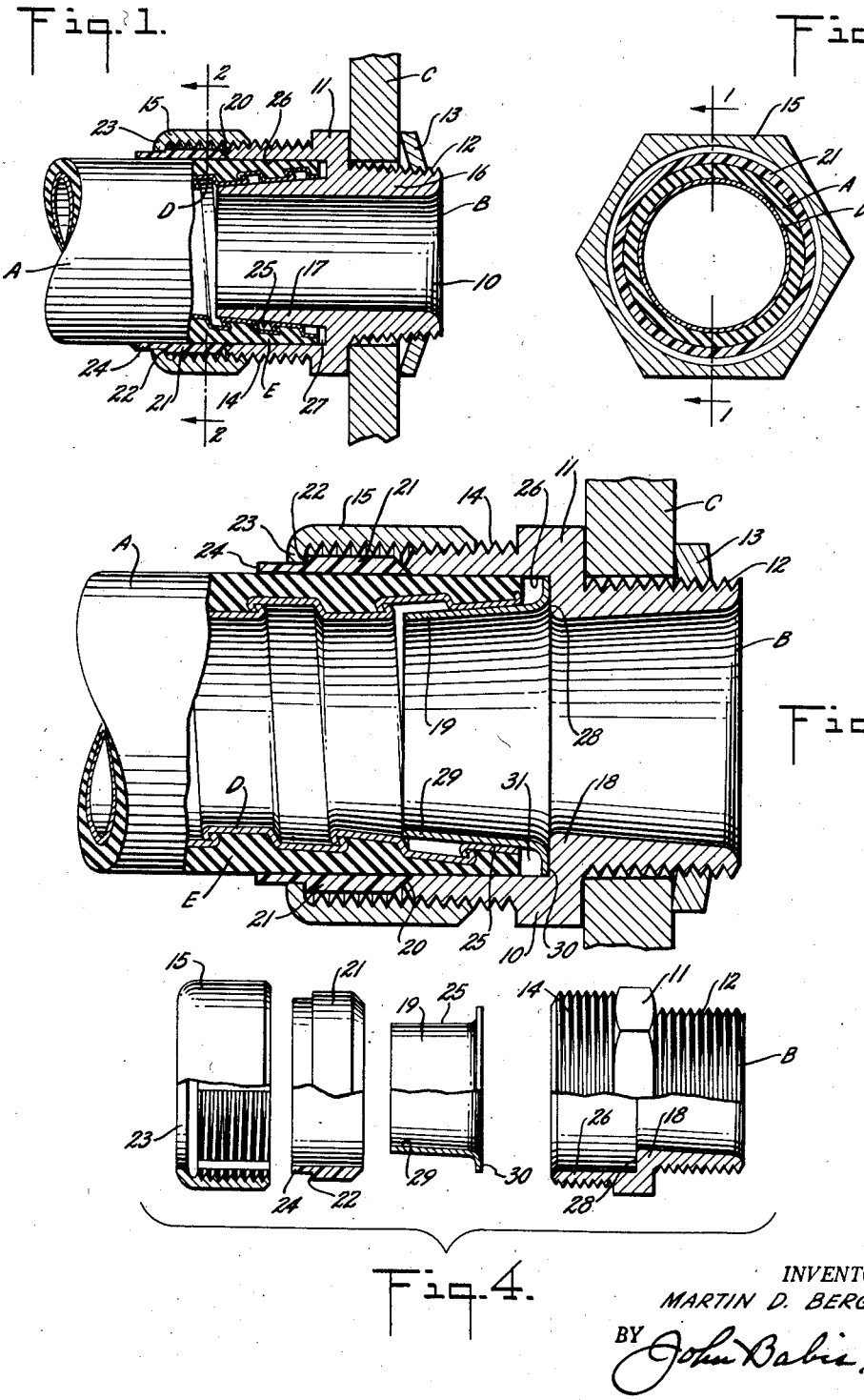
INVENTOR.
MARTIN D. BERGAN
BY
ATTORNEY.

U̇nited States Patent Office 2,821,567
Patented Jan. 28, 1958

2,821,567

FLEXIBLE LIQUID-TIGHT CONDUIT CONNECTORS

Martin D. Bergan, Westfield, N. J., assignor to The Thomas & Betts Co., Elizabeth, N. J., a corporation of New Jersey Continuation of application Serial No. 372,049, August 3, 1953. This application April 1, 1957, Serial No. 649,986

5 Claims. (Cl. 174—78)

This application is a continuation of my co-pending application Serial No. 372,049, filed August 3, 1953, now abandoned.

The invention relates to a connector for forming the terminal connecting portion of a shielded conduit of the liquid-tight flexible type now on the market and designed to protect electric conductors contained therein. These shielded conduits are similar to known forms of flexible, all-metal electric conduits, but with a moisture and liquid proof covering or shield formed of a plastic material such as synthetic rubber encasing the usual flexible steel strip lining the bore of the liquid-tight conduits.

The invention specifically relates to a terminal connector for grounding the metal lining of such flexible waterproof or insulation-jacketed electrical conduits onto supporting and grounding elements, such as junction boxes, switch boxes, fuse boxes and the like.

Difficulties have been experienced heretofore in securing metal connectors to such conduits in a required non-leaking relation, due primarily to the fact that the plastic covering material heretofore used has a tendency to cold-flow after it has been in use for a while, and this tendency, of course, is not conducive to the maintaining of its initial moisture and liquid-tight connection. Further, in those cases where a metal compression sleeve has been used to protect the plastic material of the conduit, the metal had a tendency to bite into the plastic-like covering on the conduit with eventual destruction of the same, particularly at the place of contact.

The primary object of the invention is to provide a terminal connector which will avoid these objections and provide a connection which will provide good mechanical holding quality between conduit and connector; which will provide for longer life than has been possible heretofore in the moisture and liquid sealing capacity at the connection; and which will provide the best possible electric grounding connection from the metal lining of the conduit to the connector body in order to insure protection against electric hazards.

Various other objects and advantages of the invention will be in part obvious from an inspection of the accompanying drawings and in part will be more fully set forth in the following particular description of two forms of flexible liquid-tight conduit connectors embodying the invention, and the invention also consists in certain new and novel features of construction and combination of parts hereinafter set forth and claimed.

In the accompanying drawings,

Fig. 1 is an axial sectional view taken on the line 1—1 of Fig. 2, showing an assembly of conduit and connector whose body portion is of a die cast type, featuring therein an integral dilator and illustrating one relatively small form of a preferred embodiment of the invention;

Fig. 2 is a transverse sectional view taken on the line 2—2 of Fig. 1, looking in the direction indicated by the arrows;

Fig. 3 is a view similar to that of Fig. 1, featuring a separate dilator in place of the integral dilator of Figs. 1 and 2 and illustrating a relatively large form of the invention; and Fig. 4 is an exploded view of the component parts of the connector shown in Fig. 3, disclosing their lower half in axial section and their upper half in side elevation and showing the dilator before its rounded flange end is pressed onto its seat.

Referring first to those parts which are common to the two forms of the invention, there is shown a flexible conduit A with an end inserted in a connector B forming a nipple, in turn secured to a grounding device C which may be the wall of a metallic junction box, a switch box or any other fixed support capable of grounding an electric system.

The conduit A is of a tubular type, circular in cross section, with a spiral wound steel strip D forming a flexible lining for an outer deformable covering or sheath E formed of a moisture and liquid proof plastic-like material. A synthetic rubber, one form of which is known as neoprene, has been used for forming the sheath E.

The connector B includes mainly a tubular body portion 10 externally threaded at opposite ends and provided between the threaded ends with a hexagonal turning flange 11. The body portion is of different external diameters and is provided at its smaller end with a standard tapered thread 12 carrying a lock nut 13 for securing the connector to its support provided by the grounding device C. At its larger end the body portion forms a barrel provided exteriorly with standard threads 14 on which is screwed a drawn steel gland nut 15.

In this disclosure two forms of body portions 10 are disclosed. In Figs. 1 and 2 the body portion 16 is sufficiently small so that it can be die cast to close dimensional accuracies with no machining necessary, as, for example, a zinc die casting. In this case the dilator 17, hereinafter described, can be formed conveniently with its wider base end integral with the body portion 16 and thus has the conductivity of the body portion.

In Figs. 3 and 4 the body portion 18 is a sand casting of malleable iron and must be machined. In this case the dilator 19 hereinafter described is preformed and is inserted as a separate piece into the larger end of the machined body portion 18.

While the die cast body portion must be formed straight, as shown in Figs. 1 and 2, the sand cast body portion may be formed either straight or in elbow form, usually as a 45 degree and 90 degree elbow.

The larger threaded end of the body portion 10 is inwardly beveled at about 45 degrees to form a conical seat 20 for the beveled end of a compression sleeve 21 which encircles the conduit in the part thereof projecting beyond the connector, and which sleeve is in turn encircled by the gland nut 15. The compression sleeve 21 is formed of a deformable plastic material compatible with the plastic sheath E, and in the instant case is formed of a plastic known as "Tenite 2 Formula 233." Other suitable materials for the compression sleeve are neoprene, nylon and vinyl. The sleeve 21 forms in effect a continuation of the larger threaded end of the connector, and at its end adjacent the connector is beveled outwardly to form a flared compression fit with the conical seat 20. The sleeve 21 is oil and chemical resistant, tough but pliable, has perfected aging qualities and will not cut into the outer covering E of the conduit A. The outer end portion of the sleeve 21 is reduced in diameter to form an annular shoulder 22 thereon to be engaged by an in-turned annular flange 23, defining the outer end opening of the gland nut 15, for axial compression against the shoulder 22 of the sleeve 21 encircled by the gland nut. The reduced outer end 24 of the sleeve 21 extends through the flanged end of the gland nut 15 and thus prevents contact between the gland nut and the outer covering of the conduit. Moreover, the outer end 24 of the sleeve 21 serves to pilot the sleeve so that it cannot tilt out of co-axial alignment with the connector and thereby facilitates easy entry of the conduit directly into the sleeve 21, rather than through the gland nut opening and then into the sleeve. After being in use a while the sleeve 21 tends to mold itself snugly on the outer periphery of the conduit shield E, thus assisting to obviate leakage between the conduit shield and the compression sleeve 21.

The disclosure particularly features an electrical path of low ohmic resistance for grounding the steel lining D of the conduit A onto the grounding device C through the connector. For this purpose each dilator 17 or 19 forms a grounding sleeve having a tapered outer peripheral surface 25 dimensioned to be intruded into the bore of the conduit and into dilating engagement with its lining D.

In the form shown in Fig. 1, the base of the dilator 17 is cast integral with the balance of the body portion 16. The dilator 17 is centered within the bore of the larger threaded end of the connector and forms with the wall 26 outlining the bore an annular recess 27 in which the end of the conduit is received. The dilator in both forms is dimensioned so that its smaller end can enter the metal-lined bore and acts to dilate the same as the conduit is advanced into the recess 27.

In the form disclosed in Fig. 3, the difference in the diameter of the bore in each end of the tubular body portion 18, forms a square shoulder 28 therebetween, to provide a seat for the larger flanged end of the dilator 19. The dilator 19 is constituted by a frusto-conical sleeve of sheet metal, such as steel, for example, and is drawn accurately to the required size into a tapered grounding sleeve 29 terminating at its larger end in an outwardly projecting flange 30 substantially square therewith, and having an outer diameter at least equal to that of the bore 26 in the body portion 18 in which it is contained in concentric relation and with its flange 30 in seating engagement with the shoulder 28. In the assembly thereof, the dilator 19 is inserted in the larger bore 26 in the body portion 18, and by means of a suitable tubular arbor and arbor press, for example, forced thereinto with its flanged end in seating engagement with the shoulder 28, and the outer periphery of its flange 30 in tight fitting engagement with the defining wall of the bore 26 in the body portion 18, whereby the dilator 19 and the bore defining wall 26 form therebetween an annular recess 27 in Fig. 1.

Thus, the dilator 19 is held securely in the bore of the connector in coaxial relation therewith and with its flange 30 in electric grounding contact with the body of the connector at the shoulder 28. In their lengthwise dimension, the dilator 17, in Fig. 1, and 19, in Fig. 3, extends at least to the flared compression joint formed at the conical seat 20. This means that the conduit in the plane which contains the seat 20 is being squeezed inwardly by the compression sleeve 21, and the squeeze on the conduit is resisted by the rigid mandrel formed by the smaller end portion of each dilator.

In operation, referring to both forms of the invention and assuming that the gland nut and the compression sleeve are in place, but not tightened, the conduit is inserted with a more or less snug, but sliding, fit axially through the opening in flange 23, through the compression ring 21 and into the annular recess 27. There is no twisting of the conduit; it is simply inserted with a straight push into the connector. As the metal lining D meets the resistance imposed by its contacting the tapered surface of the associated dilator, more manual force is required to advance the inserted end of the conduit along the recess than was originally imposed. As the lining D is advanced along the dilator it becomes distended with a gradual increase in its diameter towards its free end. At the same time the cross section of material at the inserted end of the conduit becomes compressed and thus more dense than in the portions externally of the connector. This has the effect of causing the metal lining to bind itself resiliently in firm electrical engagement for at least two or three turns of the lining D with the outer periphery of the dilator.

The gland nut 15 is then tightened on the threads 14 as far as it will go. This has the effect of compressibly moving the sleeve 21 axially to wedge its advanced beveled end into engagement with the beveled end of the body portion 16 forming the seat 20, thus positively closing the joint therebetween at the seat. A further advance of the gland nut 15 tends to jam the conduit still further into the connector and also tends to contract the sleeve 21 in all radial directions inwardly into a binding engagement with the conduit shield E, thus sealing the connection between the conduit A and the sleeve 21. The assembly is thus completed, ready to be mounted on the support C, as indicated.

As the reduced end 24 of the sleeve 21 is located between the flange 23 of the gland nut 15 and the conduit shield E it forms a cushioning spacing means therebetween, thus avoiding any possibility of contact between the metal gland nut and the conduit A. As the compression sleeve is somewhat resilient for its entire length there is provided a vibration and mechanical damage-resistant assembly or connection.

While the invention has been illustrated and described with respect to a preferred embodiment thereof, it is to be expressly understood that various changes and modifications may be made therein without departing from the inventive concept underlying the same. Therefore, the invention is not to be limited except as is necessitated by the prior art and the scope of the appended claims.

I claim:

1. A connector fitting for securing a fluid-tight conduit to an electrically grounded junction box, comprising an open-ended tubular body member having a screw-threaded end portion including a lock-nut thereon whereby to secure said connector fitting to said junction box, the opposite free end portion of said tubular body member being screw-threaded and its end face beveled inwardly to provide a conical seating surface therein, a raceway for electric conductors comprising a conduit having a plastic outer shield and a flexible metallic lining, said conduit having one end thereof intruded into said tubular body member with a sliding fit, a dilator carried by said body member engaging the metallic lining in said conduit and adapted to expand said lining as the conduit is forced onto said dilator, said dilator forming an electrical conductive path between said metallic lining and tubular body member, a plastic compression sleeve having a complementary beveled end face in bearing engagement with the beveled end face of said tubular body member and encircling said conduit in frictional engagement with its outer shield, and a gland nut encircling said compression sleeve in threaded engagement with the free threaded end of said tubular body member operative to force said compression sleeve axially into fluid-tight engagement with the beveled end face of said tubular body member, said compression sleeve being provided with a reduced opposite end portion between said gland nut and conduit and projecting outwardly of said gland nut to prevent contact between said conduit and gland nut.

2. A connector fitting for receiving electric conductors therethrough comprising a tubular body member of conductive metal having an externally screw-threaded end portion and an opposite end portion provided with means adapted for detachably securing said connector fitting to an electrically grounded support, said connector fitting being provided with a cylindrical bore therethrough, a flexible conduit having one end portion thereof fitting within the bore of said connector fitting with a sliding fit, said conduit being provided with a flexible lining of conductive material, a tubular dilator of conductive material within said connector fitting and of conical form with its smaller end intruded into the open end of said flexible conduit and with its larger end in electrically grounded engagement with said connector fitting, said dilator being in electrical contact with the conductive lining of said conduit and operative in its engagement therewith to squeeze the conduit in cross section between itself and the bore-defining wall of said connector fitting upon the axial advance of said conduit end portion on said dilator, a compression sleeve of yieldable material encircling said conduit end portion adjacent the end face of the threaded portion of said connector fitting, and a metallic gland nut encircling said compression sleeve in engagement with the threaded end of said connector fitting operative to force said sleeve axially into compression engagement with the adjacent threaded end of said connector fitting, said compression sleeve extending in part outwardly of said gland nut to prevent possible damage to said conduit.

3. The combination with a hollow cylindrical conduit of uniform external diameter formed primarily of a plastic-like material and whose bore is lined with a conductive material, a connector fitting of conductive material externally threaded at one end portion thereof and provided with a recess in which an end portion of said conduit is slidably inserted, a sleeve of conductive metal with one end in conductive relation to said connector fitting and its opposite end in electrical engagement with the conductive lining in said conduit, a plastic sleeve forming a continuation of the threaded end portion of said connector fitting and through which the conduit passes upon its insertion into said recess, the adjacent faces of the connector fitting and plastic sleeve being beveled to provide a flared compression joint therebetween, and a gland nut having an internal annular flange at one end thereof encircling said plastic sleeve in threaded engagement with the threaded end of said connector fitting and bearing axially on said plastic sleeve to force said plastic sleeve into fluid-tight engagement with said connector fitting and to constrict its internal diameter by reason of said beveled contacting faces to close any clearance between itself and said conduit, said plastic sleeve spacing the flanged end of said gland nut from said conduit to prevent contact therebetween.

4. In a device of the character described, the combination of a tubular connector fitting having one end portion thereof externally threaded and provided with a cylindrical bore, a conduit provided with a metal lined bore having one end portion thereof slidably fitted in the bore of said connector fitting, a wedge sleeve carried by the connector fitting intruding into said conduit end portion in electrical contact with its metal lining, said wedge sleeve being operative to distend the diameter of the lined bore of said conduit at its intruding end portion with incidental squeezing of said conduit in cross section between the wedge sleeve and the defining wall of said bore, a sleeve of compressible material having a reduced end portion defining an annular shoulder thereon encircling said conduit at the point where it projects beyond the connector fitting, and a gland nut engaging the threaded end of said connector fitting in a butting relation with said sleeve shoulder operative to force said compressible sleeve axially into fluid-tight engagement with said connector fitting and bind itself contractively on the intruded end portion of said conduit, the smaller end of said wedge sleeve extending into said conduit to a point substantially beyond the compression joint formed between the connector fitting and said compressible sleeve.

5. A connector fitting adapted to provide a terminal connection for a metal-lined conduit comprising a tubular body member provided with an open-ended bore for receiving one end portion of said conduit, one end of said body member being provided with threaded means for mounting it in place, a metal sleeve within said body member in electric engagement therewith adapted for insertion into said conduit end portion in electrical contact with its metal lining, a compression sleeve having a reduced end portion defining a shoulder thereon adapted to encircle said conduit with one end thereof in abutting relation with the opposite end of said body member, said opposite end of said body member being externally screw-threaded, and a gland nut adapted to be secured on the threaded opposite end of said body member in abutting relation with said sleeve shoulder for forcing said compression sleeve axially into fluid-tight engagement therewith, the reduced end of said sleeve extending through said gland nut to space said conduit therefrom.

References Cited in the file of this patent

UNITED STATES PATENTS 2,449,570    Violette _____ Sept. 21, 1948